June 15, 1948.         C. H. ANDERSON              2,443,288
                        SCREW CONVEYER
Filed May 28, 1946                             2 Sheets-Sheet 1
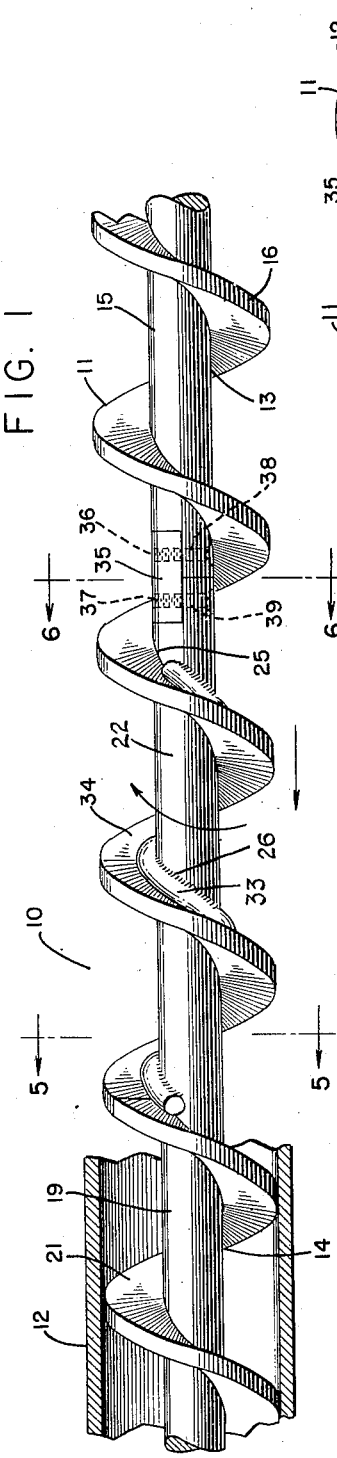
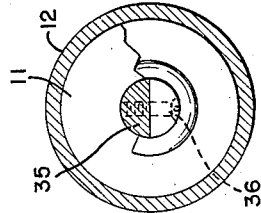
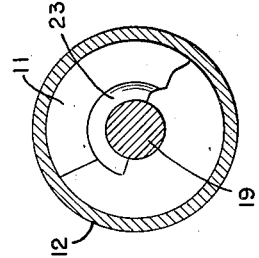
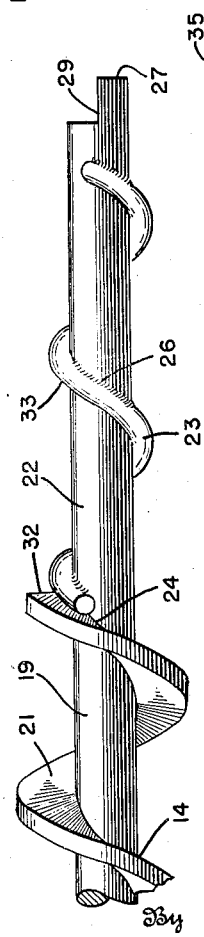
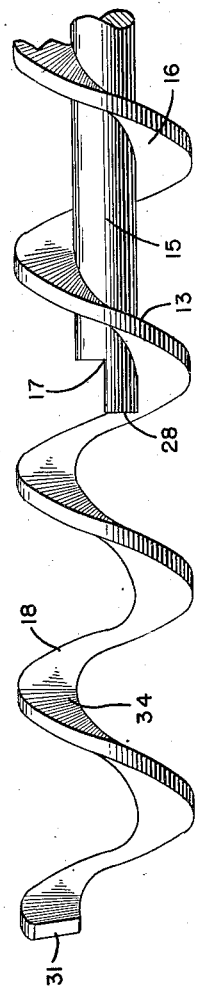
Inventor
CLIFFORD H. ANDERSON
By Caswell & Lagaard
Attorney June 15, 1948. C. H. ANDERSON 2,443,288
SCREW CONVEYER
Filed May 28, 1946 2 Sheets-Sheet 2
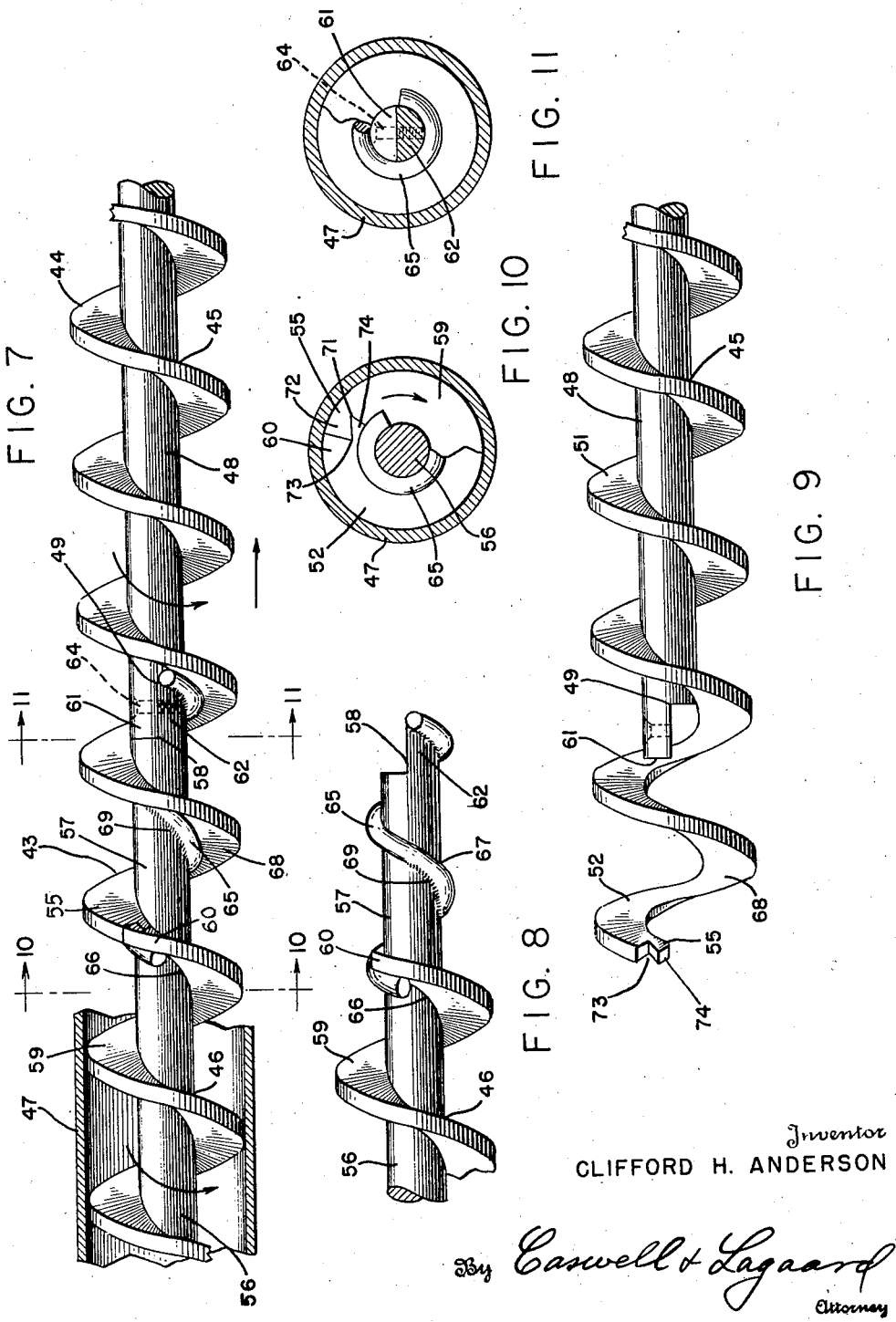
Inventor
CLIFFORD H. ANDERSON
By Caswell & Lagaard
Attorney Patented June 15, 1948

2,443,288

UNITED STATES PATENT OFFICE 2,443,288

SCREW CONVEYER

Clifford H. Anderson, Minneapolis, Minn.

Application May 28, 1946, Serial No. 672,725

13 Claims. (Cl. 198—213)

1

My invention relates to sectional screw conveyers and has for an object to provide a construction whereby the conveyer sections may be readily connected together.

Another object of the invention resides in providing a construction whereby torsional and longitudinal stresses are readily transmitted from one section to the other, both for conveyers in which the drive is located at the inlet and for conveyers in which the drive is at the outlet.

A still further object of the invention resides in constructing one section of the conveyer with a shaft extension and the other section of the conveyer with a flight extension adapted to receive the shaft extension and in further providing locking means for securing the parts together.

Another object of the invention resides in providing a construction where the flights may be joined together in continuation of one another and without increasing the thickness of the same.

A further object of the invention resides in providing hook members at the ends of the conveyer flights for interlocking arrangement with one another to transmit torsional stresses from one conveyer flight to the other.

A still further object of the invention resides in providing the shaft extension with a helical abutment for engaging the flight extension to transmit longitudinal stresses from one section to another.

An object of the invention resides in providing a helical rib extending along the reentrant angle formed between the flight extension and the shaft extension and forming the abutment for engagement with said flight extension.

A still further object of the invention resides in constructing said rib from wire or rod circular in cross section.

Other objects of the invention reside in the novel combination and arrangement of parts and in the details of construction hereinafter illustrated and/or described.

In the drawings:

Fig. 1 is a longitudinal elevational view of a portion of a conveyer illustrating an embodiment of my invention and showing a portion of the case in section.

Fig. 2 is a longitudinal elevational view of one of the conveyer sections detached from the companion conveyer section.

Fig. 3 is a view similar to Fig. 2 of a portion of the other conveyer section.

Fig. 4 is an elevational view of the connector used between the shafts of the conveyer sections shown in Figs. 2 and 3.

2

Fig. 5 is a cross sectional view taken on line 5—5 of Fig. 1.

Fig. 6 is a cross sectional view taken on line 6—6 of Fig. 1.

Fig. 7 is a view similar to Fig. 1 of another form of conveyer.

Fig. 8 is a view similar to Fig. 2 of a portion of one of the conveyer sections shown in Fig. 7.

Fig. 9 is a view similar to Fig. 8 of the companion conveyer section.

Fig. 10 is a cross sectional view taken on line 10—10 of Fig. 7.

Fig. 11 is a cross sectional view taken on line 11—11 of Fig. 7.

In the use of screw conveyers for handling coal in stoker systems for furnaces and boilers, it frequently occurs that conveyers of appreciable length are required. These conveyers are often installed in crowded quarters and have to be moved through cramped openings to bring the same to the desired localities. It hence becomes desirable to provide conveyers which may be constructed in sections and the sections readily connected together on the job to produce conveyers of the desired ultimate length. Due to the variety of installations in which such conveyers may be employed, it is often necessary to install the drive for the conveyer at either end of the same. When the conveyer drive is located at the inlet end of the conveyer, longitudinal stress is transmitted from the shaft of one section to the other by compression and torsional stress is transmitted from the flight of the drive section to that of the companion flight by tension. When the drive is located at the discharge end of the conveyer, the reverse is true. This presents two distinct problems and the present invention provides a solution for both problems.

In Fig. 1, I have shown a conveyer 10, the drive for which is located at the discharge end of the conveyer. The invention not residing in the drive, the same has not been shown in the drawings. The conveyer 10 consists of a screw 11 mounted in a case 12. The case 12 may be a tube or a box open at the top or may consist of any construction such as is now in common use for the purpose. The screw 11 is formed in two sections 13 and 14 and the case 12 may also be formed in sections which can be secured together in any suitable manner in accordance with customary practice. Since the case 12 forms no particular feature of the instant invention, the same has not been shown in detail in the drawings.

The conveyer section 13 consists of a shaft 15 which has attached to it a helical flight 16. This flight may be constructed of bar stock which is wound in the form of a helix and which is constructed so as to snugly receive the shaft 15. In the form of the conveyer shown, this flight is welded to the shaft 15 at intervals or continuously as desired. To avoid confusion, the welding of said flight to the shaft has not been shown in the drawings. The shaft 15 is formed with a recess 17 in the extreme end 28 thereof as best shown in Fig. 3. The flight 16 is constructed with a flight extension 18 which is of the same pitch and dimensions as the flight 16 but which projects outwardly beyond the end 28 of the shaft 15 as shown in Fig. 3.

The conveyer section 14 is shown in detail in Fig. 2 and includes a shaft 19 which is of the same diameter and construction as the shaft 15. The said shaft has a spiral flight 21 attached to it which is of the same form, dimensions and pitch as the flight 16 and flight extension 18. This flight is also constructed of bar stock which is welded to the shaft 19 in the same manner as the flight 16. The shaft 19 is formed with a shaft extension 22 which projects outwardly beyond the end 32 of the flight 21 and which is of the same length as the flight extension 18.

Attached to the shaft extension 22 is a helical rib 23 formed of wire or rod preferably circular in cross section. This rib is wound to form a spiral of the same pitch as the pitch of the flight extension 18 and is located in the reentrant angle 24 formed between the flight 21 and the shaft 19. When the parts are assembled, this rib becomes disposed in the corresponding reentrant angle 25 formed between the flight extension 18 and the shaft extension 22. The said rib is welded to the shaft extension 22 as indicated at 26 and along the side thereof opposite the side disposed in the angles 24 and 25. This leaves the rib free of weld at the locality of engagement with the flight extension 18 and provides a rounded surface for engaging said flight extension. This surface forms an abutment for transmitting longitudinal stress from the conveyer section 14 to the conveyer section 13.

The two shafts 15 and 19 are connected together by means of a connector 35 which is of such shape as to fit into the two notches 17 and 29 of the shaft 15 and the shaft extension 22. Screws 36 and 37 extend through openings 38 and 39 formed in the ends of the shaft 15 and the shaft extension 22 and are screwed into the connector 35 which is tapped as indicated at 41 and 42 to receive the same. By means of this construction, the two shafts are connected together in such a manner that the diameter of the shafts at the connection is not increased.

The method of connecting the two sections of the conveyer together is as follows: The section having the drive is frequently installed first. This would be section 14 of the conveyor shown in Fig. 1. The case 12 of said conveyor preferably terminates at the locality of the end 27 of the shaft extension 22 of said conveyor section. The conveyer section 13 is next placed within its case and with a short portion of the flight extension 18 projecting therefrom. The said section and tube is then positioned at the end of the shaft extension 22 and the flight extension 18 screwed on the shaft extension 22. As the section 13 advances along the section 14, flight extension 18 follows along the rib 23 until the end 28 of shaft 15 engages the end 27 of shaft extension 22. The parts are so designed that when this occurs, the notches 17 and 29 are in register and that the end 31 of the flight extension 18 is in alignment with and butts up against the end 32 of flight 21. Also, when the parts are in such position, the surface 34 of the shaft extension 18 is, throughout its extent, in engagement with the side 33 of the rib 23 which forms the abutment for engagement with the flight extension 18. Thereafter the connector 35 is applied and is secured in position by means of the screws 36 and 37. The conveyer sections are now properly connected together. The case section for the section 13 is next attached to the case section for the section 14. If the conveyer consists of more sections, the additional sections are similarly installed. The conveyer is then ready for use.

The form of the conveyer shown in Fig. 1, as previously stated, is of the type wherein the drive for the conveyer is located at the discharge end of the conveyer. In this particular case, the drive would be connected to the section 14. The screw 11 would rotate in the direction indicated by the arrow and the coal would move from the section 13 toward the section 14. It will readily be comprehended that torsional stresses would be transmitted directly in compression from the end 32 of the conveyer flight 21 to the end 31 of the flight extension 18. Since the coal in the conveyer section 13 would tend to resist travel in the direction indicated by the arrow, it would exert a pull on the flight extension 18. This pull would be directly resisted by the rib 23 whose surface 33 would be in contact with the surface 34 of the flight extension 18. Thus, transmission of power from one section to the other would be procured without stressing the connection afforded by the connector 35 and the screws 36 and 37 associated therewith.

In Figs. 7 to 11, I have shown a conveyer in which the drive is situated at the inlet end of the conveyer at which the hopper is located. This conveyer is indicated in its entirety by the reference numeral 43 and comprises a screw 44 formed in two sections 45 and 46. Said screw is mounted in a case 47 which is also constructed in sections. The sections of this case may be joined together as previously described in any suitable manner and the method of joining the same, forming no feature of the invention, has not been shown in the drawings.

The section 45 of screw 44 comprises a shaft 48 which is shown in detail in Fig. 9 and is formed at one end 61 with a recess 49. This shaft has mounted upon it, a flight 51 similar in construction to the flight 16 of conveyer section 11 and which is welded to it as previously described. This flight is provided with a flight extension 52 which projects outwardly beyond the end 53 of shaft 48.

The section 46 of conveyor screw 44 is constructed with a shaft 56 of the same diameter as the shaft 48. Mounted on the shaft 56 is a flight 59 which is of the same form and dimensions as the flight 51. This flight is welded to the shaft 56 in the same manner as the flight 51. The shaft 56 is formed with a shaft extension 57 which projects outwardly beyond the end of the flight 59. This shaft extension is constructed with a recess 58 of the same form as the recess 49. The said recesses are so constructed that the ends 61 and 62 of the shaft extension 57 and the shaft 48 overlie one another as shown in Fig. 7 when the parts are assembled. These two parts may be secured together by means of a screw 64 which extends through the end 61 and is threaded into the end 62.

Attached to the shaft extension 57 is a helical rib 65 which lies in the reentrant angle 66 formed between the flight 59 and the shaft 56. This rib has the same pitch as the flight extension 52. When the section 45 is applied to the section 66, the surface 67 of the rib 65 engages the surface 68 of the flight extension 52. This rib is welded to the shaft extension 57 as indicated at 69 on the side of the same opposite the surface 67.

For connecting the flight extension 52 to the flight 59, the end 55 of said extension is formed with a notch 73 which forms on said flight extension a hook 74. The end 60 of flight 59 is also formed with a notch 71 which provides on said flight, a hook 72. These parts are adapted to hook together and to transmit torsional stress from flight section 59 to flight section 51.

In assembling the parts of the conveyer shown in Figs. 7 to 11, the procedure is much the same as that previously described. The drive being connected to section 46, this section together with its case section may be first installed. Section 45, together with its case section, and with the flight extension 52 projecting slightly beyond said case section is placed end to end with the section 46. The flight extension 52 of section 45 is then screwed on the shaft extension 57 until the end 61 of shaft 48 engages the end 62 of shaft extension 57. Fight extension 52 will then lie intermediate the convolutions of the ribs 65. The parts are then turned until the recesses 49 and 58 lie opposite one another. The section 45 is then slid axially toward the section 46. This causes the end 60 of shaft 48 to enter the recess 58 and the end 62 of shaft extension 57 to enter recess 49. At the same time, hook 74 on flight extension 52 enters notch 71 on flight 59, and hook 72 on flight 59 enters notch 73. When the section 45 is slid inwardly as far as it will go, the parts become arranged as shown in Fig. 7. Screw 64 is next applied and the parts are then completely assembled. The helical rib 65 is so located that when the said parts are assembled, the surface 67 thereof abuts against the surface 68 of the flight extension 52 and the flight extension 52 is in alignment with flight 59.

In the form of the invention shown in Figs. 7 to 11, the drive, as previously stated, is connected to the shaft 56. This shaft rotates in the direction of the arrow. The coal, in this case, is progressed from the section 46 to the section 45. This places a tension between the flight 59 and the flight 51 and the torsional stress from the section 46 is transmitted to the section 45 through the hooks 72 and 74. Longitudinal stress is, in this form of the invention, transmitted directly by the rib 65 to the flight extension 52. This causes the coal to progress in the proper direction.

While I have described the conveyer as being formed of bar stock welded to the shaft, it can readily be comprehended that the conveyer can be cast or otherwise formed.

The advantages of my invention are manifest. Screw conveyors embodying my invention can be installed in awkward places and be moved through cramped and crooked passageways and openings. The sections can be made in standard lengths and the end sections cut down to procure any overall dimensions. By the use of the ribs located at the angle formed between the flight and the shaft, practically no substantial increase in the diameter of the shaft is procured and the coal or other material handled will readily move from one section to the other without obstruction. Where an enlargement of the shaft is procured, which extends from one convolution to the other, the coal must be compressed in order to pass such section. At the same time, the capacity of the entire conveyer is limited by the capacity at such section. This is entirely overcome with my invention. The conveyer sections are easily connected together in the field by means of tools ordinarily available to the person installing the equipment. The conveyer sections are self-aligning so that a minimum amount of time is required in installing the conveyer. The invention may be constructed at but a slight increase in cost over and above continuous sections. By using a round rod or wire for the rib, contact is provided along the face of the conveyer flight instead of at its innermost corner as would be the case if a rectangular rib were employed.

Changes in the specific form of my invention, as herein described, may be made within the scope of what is claimed without departing from the spirit of my invention.

Having described my invention, what I claim as new and desire to protect by Letters Patent is:

1. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and an abutment on said shaft extension engaging the flight extension to transmit longitudinal stress from one section to the other.

2. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical abutment secured to said shaft extension and engaging said flight extension to transmit the longitudinal stress from one section to the other.

3. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and an abutment on said shaft extension engaging the flight extension to transmit longitudinal stress from one section to the other and locking means for securing the ends of said flight extension and the juxtaposed flight together.

4. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical abutment secured to said shaft extension and having the same pitch as said flight extension and continuously engaging said flight extension for a portion of the extent thereof to transmit the longitudinal stress from one section to the other.

5. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and hooks formed on the juxtaposed parts of said conveyer flight and flight extension and interlocking one another to transmit torsional stress from one conveyer section to the other.

6. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness, hooks formed on the juxtaposed parts of said conveyer flight and flight extension and interlocking one another to transmit torsional stress from one conveyer section to the other and longitudinal stress resisting means acting between said shaft extension and said flight extension for transmitting longitudinal stress from one section to the other.

7. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib issuing from said shaft extension and engaging one surface of said flight extension for transmitting longitudinal stress from one section to the other, said rib being located in the reentrant angle formed between one side of said flight extension and said shaft extension and being spaced away from the opposite surface of the next convolution of the helix of said flight extension.

8. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib formed of wire circular in cross section and wound upon said shaft extension, said rib on one side engaging one surface of said flight extension for transmitting longitudinal stress from one section to the other and said rib being welded on the other side thereof to said shaft.

9. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib issuing from said shaft extension and engaging one surface of said flight extension for transmitting longitudinal stress from one section to the other, said rib receding along said shaft at the locality of engagement with said flight extension to form an undercut to bring the line of contact with the flight extension outwardly from the shaft extension.

10. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib issuing from said shaft extension and engaging one surface of said flight extension for transmitting longitudinal stress from one section to the other, said rib being located in the reentrant angle formed between the side of said flight extension opposite the pressure side and said shaft extension and being spaced away from the pressure side of the next convolution of the helix of said flight extension.

11. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib issuing from said shaft extension and engaging one surface of said flight extension for transmitting longitudinal stress from one section to the other, said rib being located in the reentrant angle formed between one side of said flight extension and said shaft extension and being spaced away from the opposite surface of the next convolution of the helix of said flight extension and forming a fillet between said shaft extension and said flight extension.

12. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and abutments on said flight extension and on the flight of said complemental section for engagement with one another to transmit torsional stress from the driving conveyer section to the driven conveyer section.

13. In combination, two conveyer sections for endwise connection to each other, each including a shaft and a helical conveyer flight thereon, one of the sections having a shaft extension extending beyond the conveyer flight thereof, the other of said sections having a flight extension extending beyond the shaft thereof, said shaft extension being received in said flight extension with the end of said flight extension lying in continuation of the end of the flight on the complemental section to form a continuous helix of uniform thickness and a helical rib issuing from said shaft extension and engaging one surface of said flight extension for transmitting longitudinal stress from one section to the other, said rib forming an acute angle with said shaft extension on the side facing said flight extension at the locality of engagement with said flight extension and thereby engaging said flight extension along a line spaced outwardly from said shaft extension to procure uniform contact with the flight extension throughout the extent of said rib.

CLIFFORD H. ANDERSON.

REFERENCES CITED

The following references are of record in the file of this patent:

UNITED STATES PATENTS

| Number | Name | Date |
|---|---|---|
| 665,262 | Peck | Jan. 1, 1901 |
| 902,530 | Gustavesen | Oct. 27, 1908 |
| 2,118,289 | Birkenbeuel | May 24, 1938 |
| 2,138,576 | Gebert | Nov. 29, 1938 |
| 2,292,934 | Fitch | Aug. 11, 1942 |
| 2,360,776 | Kozak | Oct. 17, 1944 |
| 2,394,163 | Gebert | Feb. 5, 1946 |